(12) United States Patent
Schonfeld

(10) Patent No.: US 11,741,530 B2
(45) Date of Patent: *Aug. 29, 2023

(54) FLEXIBLE ONLINE PRE-ORDERING SYSTEM FOR MEDIA

(71) Applicant: Activision Publishing, Inc., Santa Monica, CA (US)

(72) Inventor: Robert D. Schonfeld, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/095,072

(22) Filed: Nov. 11, 2020

(65) Prior Publication Data

US 2021/0133858 A1    May 6, 2021

Related U.S. Application Data

(63) Continuation of application No. 15/464,608, filed on Mar. 21, 2017, now Pat. No. 10,861,079.

(60) Provisional application No. 62/462,513, filed on Feb. 23, 2017.

(51) Int. Cl.
*G06Q 30/00* (2023.01)
*G06Q 30/0601* (2023.01)
*A63F 13/85* (2014.01)

(52) U.S. Cl.
CPC ..... *G06Q 30/0635* (2013.01); *G06Q 30/0641* (2013.01); *A63F 13/85* (2014.09)

(58) Field of Classification Search
CPC ............... G06Q 30/00; G06Q 30/0207; G06Q 30/0208; G06Q 30/0601; G06Q 30/0605
See application file for complete search history.

(56) References Cited

U.S. PATENT DOCUMENTS

| 4,924,378 A | 5/1990 | Hershey |
|---|---|---|
| 4,937,863 A | 6/1990 | Robert |
| 4,953,209 A | 8/1990 | Ryder |
| 5,005,122 A | 4/1991 | Griffin |

(Continued)

FOREIGN PATENT DOCUMENTS

| AU | 768367 | 3/2004 |
|---|---|---|
| AU | 2005215048 | 10/2011 |

(Continued)

OTHER PUBLICATIONS

Lu, Wen-Cheng, et al. "A study investigating the Stage-by-Stage Pre-order platform strategies-taking online pre-order catering platforms for example." Int. J. Bus. Adm. Stud 4 (2018): 239-250. (Year: 2018).*

(Continued)

*Primary Examiner* — Christopher B Seibert
(74) *Attorney, Agent, or Firm* — Novel IP

(57) ABSTRACT

The disclosed electronic commerce cloud-based media retailing systems and methods enable customers to execute a purchase intention of a digital product before that product is officially released for distribution. The ecommerce system comprises a digital entitlement engine and is particularly suited to pre-sell entitlements to digital products such as, but not limited to, video games, computer software, movies, and other entertainment media.

18 Claims, 7 Drawing Sheets

(56) References Cited

U.S. PATENT DOCUMENTS

| | | |
|---|---|---|
| 5,138,712 A | 8/1992 | Corbin |
| 5,204,897 A | 4/1993 | Wyman |
| 5,260,999 A | 11/1993 | Wyman |
| 5,337,357 A | 8/1994 | Chou |
| 5,421,009 A | 5/1995 | Platt |
| 5,438,508 A | 8/1995 | Wyman |
| 5,530,796 A | 6/1996 | Wang |
| 5,553,143 A | 9/1996 | Ross |
| 5,561,736 A | 10/1996 | Moore |
| 5,563,946 A | 10/1996 | Cooper |
| 5,638,513 A | 6/1997 | Ananda |
| 5,666,501 A | 9/1997 | Jones |
| 5,685,775 A | 11/1997 | Bakoglu |
| 5,706,507 A | 1/1998 | Schloss |
| 5,708,709 A | 1/1998 | Rose |
| 5,708,764 A | 1/1998 | Borrel |
| 5,715,314 A | 2/1998 | Payne |
| 5,736,985 A | 4/1998 | Lection |
| 5,737,416 A | 4/1998 | Cooper |
| 5,745,678 A | 4/1998 | Herzberg |
| 5,745,879 A | 4/1998 | Wyman |
| 5,754,763 A | 5/1998 | Bereiter |
| 5,758,069 A | 5/1998 | Olsen |
| 5,768,511 A | 6/1998 | Galvin |
| 5,790,664 A | 8/1998 | Coley |
| 5,825,877 A | 10/1998 | Dan |
| 5,835,692 A | 11/1998 | Cragun |
| 5,835,911 A | 11/1998 | Nakagawa |
| 5,845,077 A | 12/1998 | Fawcett |
| 5,864,620 A | 1/1999 | Pettitt |
| 5,878,233 A | 3/1999 | Schloss |
| 5,881,236 A | 3/1999 | Dickey |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,903,650 A | 5/1999 | Ross |
| 5,905,860 A | 5/1999 | Olsen |
| 5,911,045 A | 6/1999 | Leyba |
| 5,919,247 A | 7/1999 | Van |
| 5,920,325 A | 7/1999 | Morgan |
| 5,923,324 A | 7/1999 | Berry |
| 5,953,532 A | 9/1999 | Lochbaum |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,029,145 A | 2/2000 | Barritz |
| 6,044,378 A | 3/2000 | Gladney |
| 6,056,786 A | 5/2000 | Rivera |
| 6,059,842 A | 5/2000 | Dumarot |
| 6,067,582 A | 5/2000 | Smith |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,105,069 A | 8/2000 | Franklin |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,189,146 B1 | 2/2001 | Misra |
| 6,195,432 B1 | 2/2001 | Takahashi |
| 6,201,881 B1 | 3/2001 | Masuda |
| 6,202,209 B1 | 3/2001 | Bartholomew |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,367,073 B2 | 4/2002 | Elledge |
| 6,385,596 B1 | 5/2002 | Wiser |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,493,871 B1 | 12/2002 | McGuire |
| 6,499,053 B1 | 12/2002 | Marquette |
| 6,505,208 B1 | 1/2003 | Kanevsky |
| 6,513,159 B1 | 1/2003 | Dodson |
| 6,525,731 B1 | 2/2003 | Suits |
| 6,549,933 B1 | 4/2003 | Barrett |
| 6,567,109 B1 | 5/2003 | Todd |
| 6,604,238 B1 | 8/2003 | Lim |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,697,852 B1 | 2/2004 | Ryu |
| 6,717,600 B2 | 4/2004 | Dutta |
| 6,718,549 B1 | 4/2004 | Narin |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,891,953 B1 | 5/2005 | Demello |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,152,108 B1 | 12/2006 | Khan |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |

(56) References Cited

U.S. PATENT DOCUMENTS

| | | |
|---|---|---|
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |

(56) References Cited

U.S. PATENT DOCUMENTS

| | | |
|---|---|---|
| 9,764,244 B2 | 9/2017 | Bansi |
| 9,789,406 B2 | 10/2017 | Marr |
| 9,808,722 B2 | 11/2017 | Kawachiya |
| 10,861,079 B2 * | 12/2020 | Schonfeld .......... G06Q 30/0635 |
| 2001/0011238 A1 | 8/2001 | Eberhard |
| 2002/0078203 A1 | 6/2002 | Greschler |
| 2002/0128975 A1 | 9/2002 | Klemba |
| 2002/0157089 A1 | 10/2002 | Patel |
| 2002/0174422 A1 | 11/2002 | Kelley |
| 2003/0216933 A1 * | 11/2003 | Kwan .................... G06Q 30/02 705/39 |
| 2003/0216958 A1 | 11/2003 | Register |
| 2004/0015961 A1 | 1/2004 | Chefalas |
| 2004/0107368 A1 | 6/2004 | Colvin |
| 2004/0117628 A1 | 6/2004 | Colvin |
| 2004/0117631 A1 | 6/2004 | Colvin |
| 2004/0117644 A1 | 6/2004 | Colvin |
| 2004/0117663 A1 | 6/2004 | Colvin |
| 2004/0117664 A1 | 6/2004 | Colvin |
| 2004/0225894 A1 | 11/2004 | Colvin |
| 2006/0247976 A1 * | 11/2006 | Posokhow ............. G06Q 30/06 705/26.81 |
| 2007/0174144 A1 | 7/2007 | Borders |
| 2009/0113448 A1 | 4/2009 | Smith |
| 2009/0198577 A1 * | 8/2009 | Foreman .............. G06Q 20/102 705/40 |
| 2010/0070369 A1 * | 3/2010 | Fenton ............... G06Q 30/0261 705/26.1 |
| 2010/0248823 A1 | 9/2010 | Smith |
| 2010/0287044 A1 * | 11/2010 | Mason ............... G06Q 30/0211 705/14.23 |
| 2011/0138412 A1 * | 6/2011 | Roberts ............. H04N 21/8133 725/87 |
| 2012/0252579 A1 * | 10/2012 | Sethi ..................... A63F 13/795 463/40 |
| 2013/0024250 A1 * | 1/2013 | Wu ........................ G06Q 30/02 705/14.1 |
| 2013/0204718 A1 * | 8/2013 | Freeman ................ G06Q 30/00 705/26.1 |
| 2014/0100925 A1 * | 4/2014 | Popescu ................. G06Q 30/01 235/375 |
| 2014/0344725 A1 | 11/2014 | Bates |
| 2015/0199084 A1 | 7/2015 | Velusamy |
| 2016/0117646 A1 | 4/2016 | Lerick |
| 2016/0191671 A1 | 6/2016 | Dawson |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0841615 A2 | 5/1998 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 04100148 | 4/1992 |
| JP | 08190529 | 7/1996 |
| JP | 09069044 | 3/1997 |
| JP | 10040098 | 2/1998 |
| JP | 10143357 | 5/1998 |
| JP | 10283270 | 10/1998 |
| JP | 11024918 | 1/1999 |
| JP | 11110209 | 4/1999 |
| JP | 11238038 | 8/1999 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

T. Bartoletti, L.A. Dobbs, M. Kelley, "Secure Software Distribution System", Feb. 1997.

\* cited by examiner

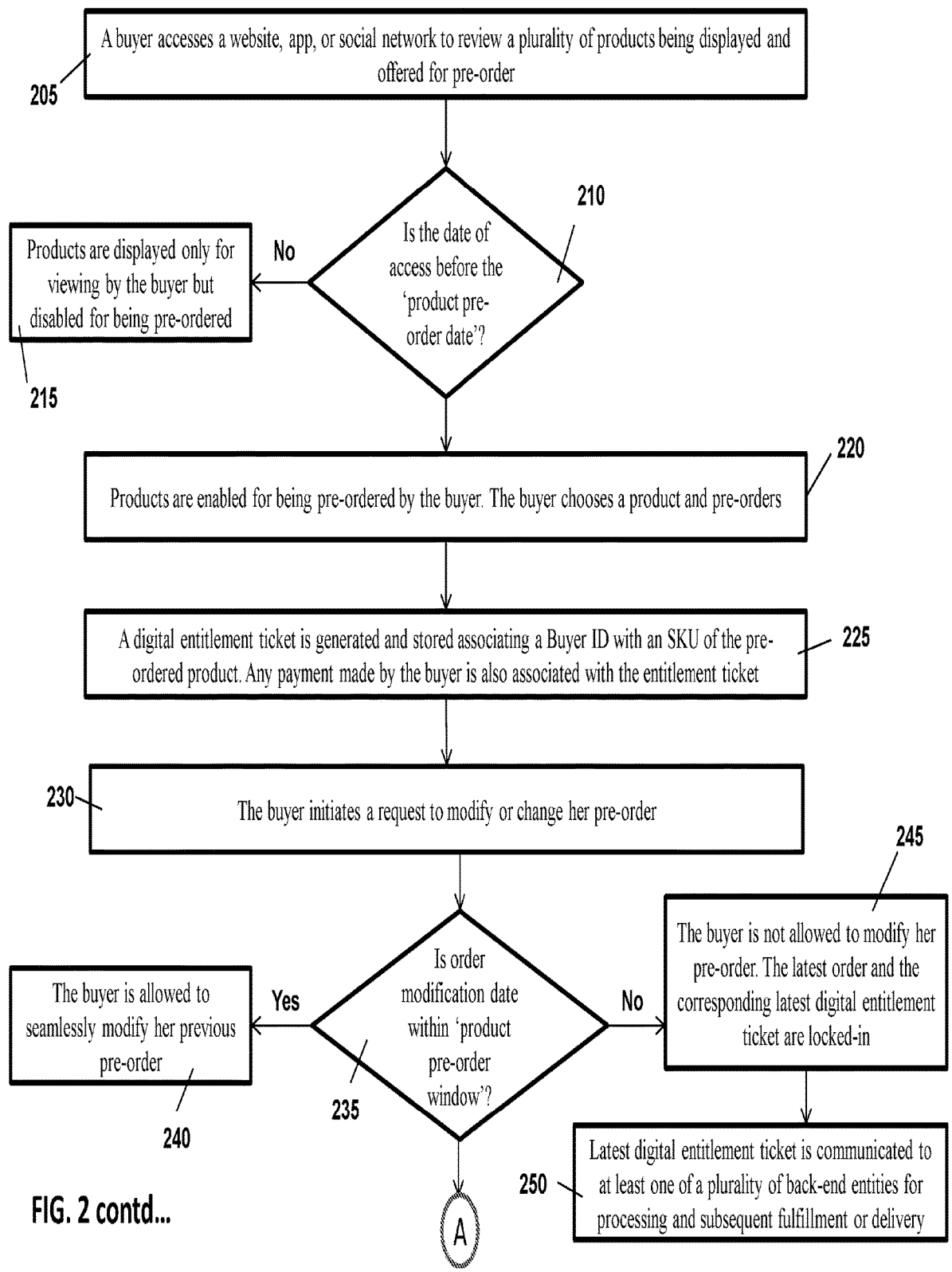
FIG. 2 contd...

You Pre-ordered on: Jan 26, 2017

Current date: Feb 27, 2017

Date of release: Mar 1, 2017

Genre: First-person shooter

I would like to confirm my pre-order for the 'call of duty' video game ● Yes ○ No

Confirm the Game options

| | | |
|---|---|---|
| Platform: | ○ MS Windows | ○ OS X |
| | ○ N-Gage | ○ Xbox 360 |
| | ○ PlayStation 3 | |
| Mode: | ○ Single-player | |
| | ○ Multi-player | |
| Engine: | ○ Gaming Engine 3 | ○ Gaming Engine 6 |

[Confirm my Order]

FIG. 3C

You Pre-ordered on: Jan 26, 2017

Current date: Feb 27, 2017

Date of release: Mar 1, 2017

Genre: First-person shooter

I would like to confirm my order for the 'call of duty' video game   ⦿ Yes   ○ No

Confirm Game options (indicate your previously chosen options)

Platform:  ⦿ MS Windows   ○ OS X
              ○ N-Gage        ○ Xbox 360
              ○ PlayStation 3

Mode:  ○ Single-player
           ⦿ Multi-player

Engine:  ⦿ Gaming Engine 3   ○ Gaming Engine 6

[Confirm my Order]

FIG. 3D

FLEXIBLE ONLINE PRE-ORDERING SYSTEM FOR MEDIA

CROSS REFERENCE

The present application is a continuation application of U.S. patent application Ser. No. 15/464,608, entitled "Flexible Online Pre-Ordering System for Media" and filed on Mar. 21, 2017, which relies on, for priority, U.S. Patent Provisional Application No. 62/462,513, of the same title and filed on Feb. 23, 2017, both of which are herein incorporated by reference in their entirety.

FIELD

The present specification discloses systems and methods for online commerce. More specifically, the present specification discloses flexible pre-ordering systems that enable users to pre-order media products, such as video games, before their commercial release while still permitting online retailers to modify any related product identification codes, product type, product mix, and other attributes of the purchased media prior to release.

BACKGROUND

Media products, such as video games, music, movies, TV shows, and e-books are often available for purchase even before they are made available for actual release and distribution. The process of pre-ordering enables customers to reserve a copy of a popular product, so that it is manufactured and made available to them when the product is subsequently released, and further enables manufacturers to gauge demand for a product and therefore optimize its initial development and production.

As the software services and the gaming industries grow, several online marketplaces offer a variety of these services and gaming experiences. Pre-orders can be placed by customers for several of these digital products a few days, weeks, or months prior to their release. While the customers placing pre-orders for a product may be entitled to certain benefits in the form of additional features, access to limited editions, or other privileges and incentives, existing ordering systems are unable to account for changes to the pre-ordered product by the retailer or manufacturer or changes in the purchasing decisions by consumers. Also, manufacturers of these products often do not have the ability to retain, or have limited access to, first-party data. Additionally, conventional online marketplaces do not allow the creation of bundles of products that may be from different providers, against a single SKU, and, subsequently, a modification of that SKU after a product has been purchased by a user. An SKU, or stock keeping unit, is a product and/or service identification code for each product, which enables tracking the inventory for that product and/or service. The product can be a physical product or an intangible product such as, but not limited to, software or a service. As a result of the fixed SKUs, further changes to it are disallowed, even while the product and/or service evolves, as is common for a pre-ordered product.

Typically, the online marketplaces comprise either fully vertically integrated companies or front-end only companies. Vertically integrated companies, such as Amazon®, have customer facing front-end graphical user interfaces, which accept on-line orders and are vertically integrated with a logistics delivery back-end. Integrated marketplaces are very capital intensive infrastructures that are expensive to maintain and require large sale volumes to make profitable. Front-end only companies comprise media publishers who may present a customer facing front end graphical user interfaces through which their products are sold but rely on third party companies to actually fulfill any order received. In such cases, the entire purchasing infrastructure is separate from, and not integrated with, third party logistics, distribution, and delivery companies.

While cheaper to maintain, a front-end only marketplace results in a publisher having very little flexibility in handling pre-orders. Because they rely on third parties to stock and fulfill product orders, such publishers must define all product options upfront, communicate those options to the third party logistics provider, and, if the publisher wants to change those options, as the product evolves before actual release, it needs to issue a new SKU for a new or evolved product. This restricts publishers from being able to improve products after preorders begin. This also creates significant friction for consumers who wish to exhibit an interest in obtaining a media product in the future but do not necessarily know exactly what platform, such as which gaming platform or operating system, or package type, such as a bundled package with other titles or a package including extra content, to commit to in the present. As a result, while media publishers would like to book sales in the present for a product that will be released in the future, consumers often hesitate to make such purchases because they are unclear on what additional options they should select, in addition to the basic media product itself, or because they fear that whatever options they are forced to choose, in addition to the basic media product itself, will not be desirable when the media product is actually released. For example, the consumer may have an Xbox gaming system when the pre-order is made available but may be considering moving to a Playstation gaming system in the future. If the customer chooses wrong, he will have to go through a burdensome return and/or re-ordering process since there is no flexibility on how to change or modify the order.

Accordingly, there is a need for a flexible marketplace for digital products that provides greater flexibility to customers, retailers and manufacturers within the currently available processes for placing pre-orders and fulfilling them in the stated time. There is also a need for a defined process and associated set of interfaces that enable customers to pre-order products, allow retailers make modifications to those pre-ordered products, and permit customers to flexibly change purchase decisions.

SUMMARY

The following embodiments and aspects thereof are described and illustrated in conjunction with systems, tools and methods, which are meant to be exemplary and illustrative, not limiting in scope.

In some embodiments, the present specification discloses a pre-ordering electronic commerce transaction system comprising at least one server having at least one processor and a plurality of programmatic instructions stored in a non-transient memory wherein, when said plurality of programmatic instructions are executed by the at least one processor, said programmatic instructions: generate data representative of one or more first graphical user interfaces, wherein said one or more first graphical user interfaces comprise an option to purchase a media product and do not include a requirement to select additional media product attributes; concurrently transmit said data to a first plurality of client devices such that each of said first plurality of client devices receives data representative of said one or more first graphical user interfaces and generates said one or more first graphical user interfaces; receive data representative of users' selection to purchase said media product; store data representative of users' selection to purchase said media product in a non-transient memory; within a predefined period of time before a release date for said media product, generate data representative of one or more second graphical user interfaces based on said data representative of a user's selection to purchase said media product, wherein said one or more second graphical user interfaces comprise a request to select said additional media product attributes; concurrently transmit said data to a second plurality of client devices such that each of said second plurality of client devices receives data representative of said one or more second graphical user interfaces and generates said one or more second graphical user interfaces; receive data representative of users' selection of said additional media product attributes; and store data representative of users' selection to said additional media product attributes in a non-transient memory.

Optionally, for both of the transmissions to the first and second plurality of client devices, which may or may not have client devices in common, the server is configured to present the graphical user interfaces, described herein, to over at least 50 client devices concurrently and/or host at least 10 transactions per second concurrently. The pre-ordering electronic commerce transaction system is preferably configured to concurrently host at least 50 client devices, and more preferably 50 to 750,000 client devices or any increment therein, such that each of said at least 50 client devices are permitted to concurrently visit one or more first graphical user interfaces or one or more second graphical user interfaces. In another embodiment, the pre-ordering electronic commerce transaction system is configured to concurrently host at least 10 transactions per second, preferably 100 transactions/per second, with the first or second plurality of client devices.

Optionally, the media product in the electronic commerce transaction system is a video game and the additional media product attributes comprise at least one of a gaming platform and a player mode. Optionally, the media product is a movie and the additional media product attributes comprise a format of the movie.

Optionally, the second graphical user interface further comprises a request to confirm a user's prior selection to purchase the media product.

The predefined period of time before the release date for said media product may be up to twelve months.

In one embodiment, the electronic commerce transaction system further comprises programmatic instructions executed by the at least one processor to, prior to said predefined period of time, generate data representative of one or more payment transaction graphical user interfaces, wherein said one or more payment transaction graphical user interfaces comprises a request to provide financial payment data.

Optionally, the concurrent transmission of the data representative of the one or more first graphical user interfaces may be programmed to occur more than one day before the predefined period of time. Optionally, the concurrent transmission of said data representative of said one or more first graphical user interfaces may be programmed to occur more than one week before the predefined period of time.

In one embodiment, the electronic commerce transaction system further comprises programmatic instructions executed by the at least one processor to, prior to said predefined period of time, receive data representative of users' modified selection to purchase said media product and store data representative of users' modified selection to purchase said media product in a non-transient memory.

Optionally, the one or more first graphical user interfaces consist of one or more images of the media product, an option to purchase said media product, and payment transaction graphical user interfaces comprising a request to provide financial payment data. Optionally, the media product is a video game and the one or more first graphical user interfaces comprise one or more images of the video game and an option to purchase said video game and do not comprise a requirement to select a gaming platform for said video game.

Optionally, the one or more second graphical user interfaces comprise the requirement to select the gaming platform for the video game, wherein the one or more second graphical user interfaces are transmitted only after a second period of time after the one or more first graphical user interfaces are transmitted, and wherein the second period of time is at least three days.

In some embodiments, the present specification is directed toward a method of pre-ordering a media product using an electronic commerce transaction system comprising at least one server having at least one processor and a plurality of programmatic instructions stored in a non-transient memory, said method comprising: generating data representative of one or more first graphical user interfaces, wherein said one or more first graphical user interfaces comprise an option to purchase a media product and do not include a requirement to select additional media product attributes; concurrently transmitting said data to a plurality of client devices such that each of said client devices receives data representative of said one or more first graphical user interfaces and generates said one or more first graphical user interfaces; receiving data representative of users' selection to purchase said media product; storing data representative of users' selection to purchase said media product in a non-transient memory; within a predefined period of time before a release date for said media product, generating data representative of one or more second graphical user interfaces based on said data representative of a user's selection to purchase said media product, wherein said one or more second graphical user interfaces comprise a request to select said additional media product attributes; concurrently transmitting said data to a plurality of client devices such that each of said client devices receives data representative of said one or more second graphical user interfaces and generates said one or more second graphical user interfaces; receiving data representative of users' selection of said additional media product attributes; and storing data representative of users' selection to said additional media product attributes in a non-transient memory.

Optionally, the media product is a video game and said additional media product attributes comprise at least one of a gaming platform and a player mode. Optionally, the media product is a movie and said additional media product attributes comprise a format of the movie.

Optionally, the second graphical user interface further comprises a request to confirm a user's prior selection to purchase the media product.

The predefined period of time before the release date for said media product may be up to twelve months.

In one embodiment, the method of pre-ordering a media product using an electronic commerce transaction system further comprises, prior to the predefined period of time, generating data representative of one or more payment transaction graphical user interfaces, wherein the one or more payment transaction graphical user interfaces comprise a request to provide financial payment data.

Optionally, the concurrent transmission of the data representative of the one or more first graphical user interfaces may be programmed to occur more than one day before said predefined period of time.

Optionally, the media product is a video game and the one or more first graphical user interfaces comprise one or more images of the video game and an option to purchase said video game and do not comprise a requirement to select a gaming platform for said video game.

Optionally, the one or more second graphical user interfaces comprise the requirement to select said gaming platform for said video game, wherein the one or more second graphical user interfaces are transmitted only after a second period of time after the one or more first graphical user interfaces are transmitted, and wherein the second period of time is at least three days.

The aforementioned and other embodiments of the present invention shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 3B shows another exemplary interface displayed to enable the buyer to pre-order the product along with a set of example attributes to choose from;

FIG. 3C shows a first exemplary interface displayed (at a time proximate the product release date) to enable the buyer to confirm purchase of the product along with a set of attributes; and, FIG. 3D shows a second exemplary interface displayed (at a time proximate the product release date) to enable the buyer to confirm purchase of the product along with a set of attributes.

DETAILED DESCRIPTION

The presently disclosed electronic commerce cloud-based media retailing system enables customers to execute a purchase intention of a digital product before that product is officially released for distribution. Buyers are able to purchase digital products that are independent of corresponding stock keeping units (SKUs), which may be assigned later or which may be assigned but still evolving during the development of the digital product. Additionally, the buyers are able to purchase the digital media products independent of a specific gaming or playback platform, such as Playstation® or Xbox®, that will be eventually required for its execution. In embodiments, the method is implemented through a Graphical User Interface (GUI) provided to buyers through computing systems such as a laptop, mobile phone, desktop, tablet computer, or gaming console, comprising a processor in data communication with a server.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

Figure 1:
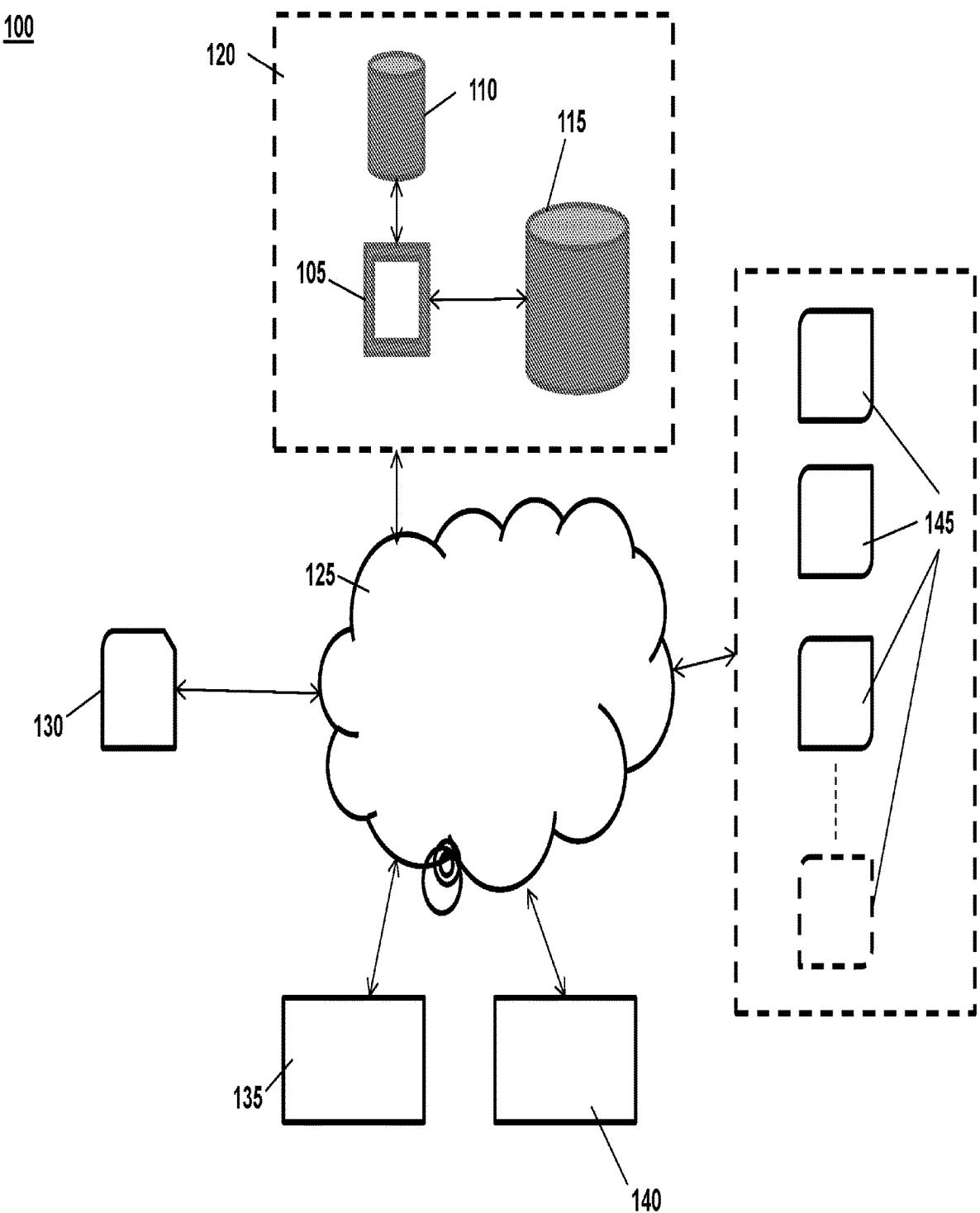
FIG. 1 illustrates a server architecture in accordance with embodiments of the present specification.

FIG. 1 illustrates an e-commerce architecture 100 in accordance with some embodiments of the present specification. As shown in FIG. 1, the architecture 100 comprises a digital or online retail system 120 having a front-end GUI (Graphical User Interface) integrated into a website or mobile application (app) 105 hosted using a server and a database management system (DBMS) implemented on at least one server 110. In various embodiments of the digital retail system 120, and in accordance with aspects of the present specification, the front-end GUI or website 105 is in data communication with a digital entitlements (DE) engine 115 which is software implemented on at least one server. It should be appreciated that the DE engine 115, in some embodiments, may be implemented on the server 110 itself instead of being implemented on a separate standalone server, or that implementations of the DE engine, DBMS, and website or mobile application may be distributed across multiple servers in a "cloud" configuration.

The website or mobile app 105 is accessible to a plurality of buyers, such as buyer 130, via network 125 which is a wired, wireless, private or public network. The digital retail system 120 is enabled for electronic commerce (e-commerce) and is in data communication, via network 125, with a payment processing system or payment gateway 135 and a customer relationship management (CRM) system 140. The digital retail system 120 is in data communication, via network 125, with a plurality of back-end entities 145 (145a through 145c, for example) such as, but not limited to, logistics companies, vendors, sellers and/or manufacturers of products and services, who receive data on, and are tasked with delivering, the purchased products.

As known to persons of ordinary skill in the art, the payment processing system or gateway 135 is a merchant service provided by an e-commerce application service provider that authorizes credit card or direct payments processing for e-businesses, online retailers or traditional brick and mortar. The payment gateway may be provided by a bank to its customers, but can be provided by a specialised financial service provider as a separate service. The payment gateway facilitates a payment transaction by the transfer of information between a payment portal (such as the website 105) and a front end processor or acquiring bank.

The customer relationship management (CRM) system 140, as known to persons of ordinary skill in the art, facilitates a company's interaction with current and potential future customers for operational activities such as customer support, sales and marketing. The CRM systems compile data from a range of different communication channels, including a company's website, telephone, email, live chat, marketing materials and social media in order for businesses to learn more about their target audiences and how to best cater to their needs. For example, CRM tools with marketing automation capabilities automate repeated tasks, such as, sending out automated marketing emails at certain time to customers, or posting marketing information on social media. The goal with marketing automation is to turn a sales lead into a full customer. Also, through customer service automation, customers are supported through multiple channels such as phone, email, knowledge bases, ticketing portals, and FAQs to facilitate modifications, such as return, cancellation or exchange of products and/or services bought online.

The presently disclosed embodiments are uniquely suited to online commerce architectures where the customer-facing retailing system 120 is owned and controlled by one business entity ("Retailer Entity") and the back-end logistics and fulfilment system 145 is owned and controlled by a different business entity ("Fulfilment Entity"). In such situations, pre-ordering transactions are plagued by rigidities arising from the discontinuity around the Retailing Entity's desire to offer products and/or services that are not yet commercially available and subject to change and the Fulfilment Entities desire to immediately allocate inventory when a purchase order is received. More specifically, when the buyer 130 purchases a product, the purchase order is sent out to one of the entities 145, such as a back-end logistics company, to be immediately fulfilled. If the buyer wants something different, she engages in a conventional return process (via the CRM system 140, for example) to return or exchange the product (or buy additional components). However, in the context of pre-orders where no product has, or can, be delivered, prior art e-commerce scenarios are cumbersome in handling when the buyer wishes to change an order before any fulfilment of the order. On one hand, the buyer's expectation is that she should seamlessly be able to change her order (since the buyer has not actually received the order yet, so she should be able to change it). On the other hand, when the buyer buys a product, it enters into the back-end fulfilment entities 145 which then allocate the product from inventory and if a change is required, it's hard to effectuate because the product has been "bought" and therefore should be subject to a conventional return process. Prior art e-commerce scenarios are also not enabled to handle situations where the product itself changes, thereby resulting in a different associated SKU, after the purchase but before the order is fulfilled.

The systems and methods of the present specification are directed towards overcoming the rigidities and short-comings in prior art e-commerce scenarios. The e-commerce architecture 100 of FIG. 1 implements methods and systems to enable the pre-selling of products and/or services by the Retailer Entity before these are actually commercially available for distribution or delivery to customers. The e-commerce architecture 100 of FIG. 1 is particularly enabled to pre-sell entitlements to digital products such as, but not limited to, video games, computer software, movies, and other entertainment media. It should be appreciated that these digital products are available for purchase or pre-order while still not being commercially available for actual distribution to a customer.

Referring now to FIG. 1, in accordance with aspects of the present specification, the DE engine 115 enables the digital retail system 120 to offer a digital product for pre-ordering from a product pre-order date, register a buyer's (such as the buyer 130) purchase or entitlement to the digital product during a product pre-order window, allow the buyer 130 to seamlessly modify or change her order during the product pre-order window and lock-in the buyer's order at or at a certain date prior to a product release date.

The product pre-order date is the date when a Retailer Entity offers the product, such as a video game, movie, television show, series, or other entertainment media, for purchase, but not for actual release and distribution to a buyer. The product release date is the date when a product becomes available for actual distribution to a buyer such that the customer can receive and use the product. The product pre-order date may be any date in advance of the product release date. For example, the product pre-order date may be a day to eighteen months in advance of the product release date or any increment therein. The product pre-order window is the time frame during which the buyer can pre-order a product, register her entitlement to the product, and/or modify or change her order or entitlement prior to the product release date. The product pre-order window may start from the product pre-order date and end on the product release date or may start from the product pre-order date and end a predefined period prior to the product release date. In various embodiments, the predefined period may range from an hour to a month, and any time increment therein.

In some embodiments, the buyer 130 can modify or change her order or entitlement to the product any number of times during the product pre-order window. However, in alternate embodiments, the buyer 130 can modify or change her order only for a predefined number of times during the product pre-order window. In various embodiments, the predefined number of times the buyer can modify or change her entitlement to the product varies from 1 to 100 or any whole number increment therein. At the end of the product pre-order window the buyer's order or entitlement is locked or considered confirmed. In other words, the buyer's order or entitlement to the product changes from a pre-order or transient status to that of a confirmed status.

In accordance with aspects of the present specification, the DE engine 115 is configured to enable the digital retail store, website or app 105 to display at least one product, which in various embodiments is a digital product, such as a movie, video game, television show, or other entertainment media, any time prior to or from the product pre-order date. The DE engine further enables the digital retail store, website or app 105 to accept purchase order or entitlement requests from the buyer 130 only on or after the product pre-order date, track a plurality of modified or changed orders or entitlements (including associated payments, if any) of the buyer 130 to the product during the product pre-order window, restrict the buyer 130 from making further modifications or changes to the order or entitlement at the end of the product pre-order window, lock-in the buyer's final order or entitlement request prior to the product release date, and, from the product release date, communicate the buyer's final order or entitlement request to one of the plurality of entities 145 for processing and fulfilment or delivery.

When the buyer 130 selects and pre-orders the product (during the product pre-order window), a digital product entitlement ticket is generated by the DE engine 115 and stored in the database management system associated with the digital retail store, website or app 105. The digital entitlement ticket comprises at least the Buyer ID, SKU of the product, purchase price, time stamp (date and time of purchase), payment status (that is, paid or unpaid) and the quantity (where necessary). In embodiments, the digital entitlement ticket is accorded a transient status during the product pre-order window. In embodiments, the DE engine 115 also assigns a unique counter to the digital entitlement ticket that keeps track of the number of times the buyer 130 modifies or changes the pre-order.

In some embodiments, the buyer 130 then initiates online payment for the pre-order, which is executed using the payment processing system 135. On successful payment, the DE engine 115 considers the digital entitlement ticket executable, valid or paid (payment status is set to 'paid') and updates the ticket in the database management system. In alternate embodiments, the buyer 130 may be required to pay only at the time of actual delivery, distribution or consumption of the product (cash-on-delivery, for example). In such embodiments, the DE engine 115 considers the digital entitlement ticket executable or valid even without payment. In still alternate embodiments, the buyer 130 may be required to pay online only at the end of the product pre-order window or on the product release date. In all cases, the DE engine 115 considers the digital entitlement ticket as executable or valid with or without payment prior to the end of the pre-order window or prior to the product release date where actual delivery, distribution or consumption of the product becomes possible.

In embodiments where the buyer 130 pays for the product, such as through an online payment, the DE engine 115 holds or stores the payment as received from the Buyer ID within the database management system and associates the payment with the corresponding digital entitlement ticket. During the product pre-order window, situations or offers may arise that may prompt the buyer 130 to modify or change her pre-order. In a non-limiting example, the product may evolve ('evolved product') during the product pre-order window in terms of a plurality of product attributes (evolved product attributes) such as functionalities, features, discounts, offers/incentives, warranty, terms related to future product updates, bundling, underlying platform and/or operating system versions. Bundling is a retailing practice where multiple products may be packaged together and sold for an overall lower price, thereby incentivizing a buyer. For example, where one video game (product) may be $19.95 and a second video game may be $19.95, the bundle of the two video games may be offered for pre-order at $36, thereby signalling to the customer that she would be getting a deal for the two video games (saving approximately $4). In a pre-order scenario, the bundling may change. For example, the website 105 may offer for pre-order an updated version of a highly popular game for $49.95. A buyer may purchase it. During the product pre-order window, the website 105 may then decide to bundle that game with another less popular game (worth $30) and offer the bundle for $69.95. The buyer who bought the presale of the popular game may then wish to buy the bundle instead.

Such evolved product attributes, in some embodiments, may or may not warrant a price difference (that is, higher or lower) from the one which the buyer 130 previously paid. The evolved product (with the evolved product attributes) may also have a modified or new SKU compared to the one that the buyer 130 pre-ordered earlier. If the buyer 130 decides to modify her pre-order to the evolved product, the DE engine 115 cancels the earlier digital entitlement ticket to generate a new or different ticket corresponding to the evolved product. Similarly, association of the earlier payment with the earlier digital entitlement ticket is also modified or cancelled and the payment is now re-associated with the new ticket corresponding to the evolved product (and updated within the database management system).

The buyer 130 is presented with a demand for any additional payment in case the price of the evolved product (second product) is higher than that of the different, earlier-ordered product (first product). Similarly, the buyer's account may be automatically credited with a differential amount in case the price of the evolved product is lower than that of the earlier ordered product. In embodiments where the buyer 130 was not required to pay while pre-ordering, the DE engine 115 simply cancels the earlier digital entitlement ticket to generate the new or different ticket corresponding to the evolved product.

It is also possible, that during the product pre-order window, the buyer 130 may want to cancel her pre-order. In such a case, the DE engine 115 cancels the earlier digital entitlement ticket and automatically credits the amount, earlier paid, to the buyer's account. In embodiments where the buyer 130 was not required to pay while pre-ordering, the DE engine 115 simply cancels the earlier digital entitlement ticket.

It should be appreciated that, in embodiments, the product may evolve a plurality of times (in terms of various product attributes) during the product pre-order window and, correspondingly, the buyer 130 may cancel, modify or change her pre-order a plurality of times as well. In alternate embodiments, however, the buyer 130 is restricted to cancel, modify or change her pre-order only a finite pre-defined number of times, such as the number of times that the product being sold is changed or modified. For example, if the product comprising a SKU changes three times, a user is provided with three opportunities, during the pre-order window, to modify the digital entitlement ticket without penalty. In alternate embodiments, the buyer 130 is restricted to cancel, modify or change her pre-order only a finite pre-defined number of times, after which the buyer 130 is charged a fee for effectuating a change to the digital entitlement ticket. In one embodiment, certain products may not be eligible for refund during pre-order. In this case, the number of times buyers can cancel, modify or change their pre-orders is set to zero.

At the end of the product pre-order window, the DE engine 115 causes the app or website 105 to stop accepting, from the buyer 130, any further modifications to her pre-order. The latest digital entitlement ticket of the buyer 130 is locked and the order status is changed from transient to that of confirmed. Starting from the product release date, the DE engine 115 communicates the buyer's final order or entitlement ticket to one of the plurality of entities 145 for subsequent processing and fulfilment or delivery.

Figure 2:
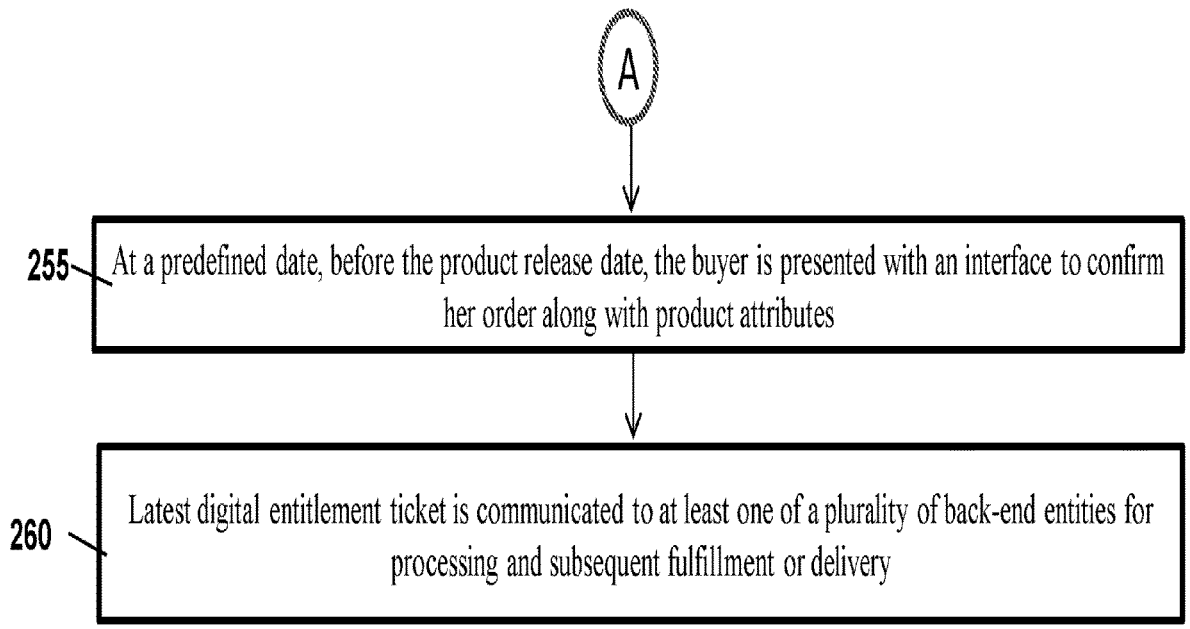
FIG. 2 is a flow chart illustrating e-commerce processes in accordance to embodiments of the present specification.

FIG. 2 is a flow chart illustrating a plurality of steps of a method of implementing e-commerce processes in accordance to an embodiment of the present specification. In various embodiments, the DE engine 115 of FIG. 1 is configured or programmed to implement the plurality of steps of the method of FIG. 2. Referring now to FIGS. 1 and 2 simultaneously, at step 205 a buyer 130 accesses the app, social network, or website 105 (using her login credentials that define a unique Buyer ID on the website 105) to review a plurality of products being displayed and offered for pre-order. In some embodiments, the product is a digital product such as, but not limited to, a movie, television show, video game or other entertainment media or software, or a combination thereof. At step 210, the DE engine 115 determines if the date of access of the website 105 (by the buyer 130) is equal to or more than a product pre-order date. If the date of access of the web site 105 is less than the product pre-order date then the plurality of products are displayed only for viewing by the buyer 130, at step 215, but disabled for being pre-ordered.

However, if the date of access of the app or website 105 by the buyer 130 is after the product pre-order date but less than a predefined period before the product release date, then the plurality of products are enabled for being pre-ordered by the buyer 130. The buyer may now choose a product (having a plurality of product attributes, that may or may not be displayed for choice at this time) and pre-order the product, at step 220.

Figure 3A:
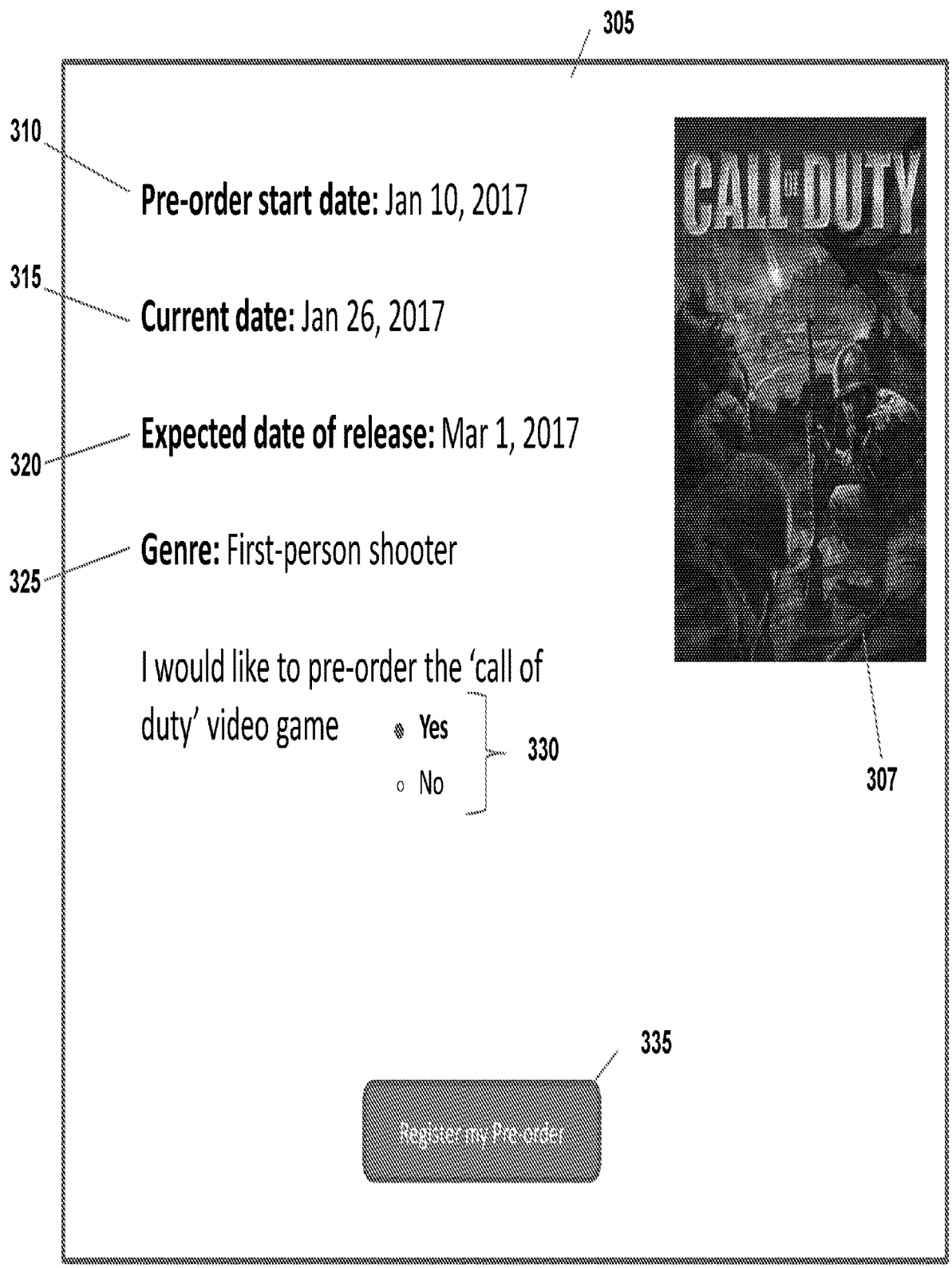
FIG. 3A shows an exemplary interface displayed to enable a buyer to pre-order a product.

FIG. 3A shows an exemplary GUI (Graphical User Interface) 305 displayed to enable the buyer 130 to pre-order a product 307 such as, for example, the 'Call of Duty' video game. It should be appreciated that this graphical user interface, and others described below, are generated by software and processors in a user client device, such as a mobile phone, tablet, laptop, watch, or desktop computer, in response to data received from, and sent by, a server hosting programmatic instructions which, when executed, enable the pre-order methods described herein. It should further be appreciated that the server is configured to present the graphical user interfaces, described herein, to over at least 50 potential purchasers (client devices) concurrently and/or host at least 10 transactions per second, as described herein, concurrently. In one embodiment, the pre-ordering electronic commerce transaction system is configured to concurrently host at least 50 client devices, and preferably 50 to 750,000 client devices or any increment therein, such that each of said at least 50 client devices are permitted to concurrently visit one or more first graphical user interfaces or one or more second graphical user interfaces. It may further be noted that for the purpose of the present application, a "visit" is defined as a user session that occurs when a client device sends a request to a server and, as a response, the website or app content requested from the server is displayed. The duration of a visit, or user session, starts with the first page view and ends with the last page view. In another embodiment, the pre-ordering electronic commerce transaction system is configured to concurrently host at least 10 transactions per second, preferably 100 transactions/per second, with a plurality of client devices.

Referring now to FIGS. 1, 2 and 3A, the interface 305 displays the pre-order start date 310, the current date 315 on which the buyer 130 access the app or website 105, the expected date of release 320 of the product, genre 325 and options 330 to choose or not-choose to pre-order the product. The buyer 130 may click a button 335 to confirm his choice to pre-order (or not). It should be noted that the current date of access 315 is after the product pre-order start date 310 but less than a predefined period before the product release date 320, as a result of which the buyer 130 is enabled to pre-order the product 307. It should further be appreciated that this first interface 305 and/or all subsequent interfaces in this ordering process may only include the offer to purchase the media product, such as a video game, and some imagery representative of the media product itself and expressly not include any other requests for selecting product options, such as a requirement to identify a gaming platform, operating system, mode of play (single player or multi-player), gaming engine, or other product-specific details. By allowing a user to pre-order a product without identifying otherwise essential product-specific details, the presently disclosed methods substantially decrease consumer hesitation to pre-order gaming products.

Figure 3B:
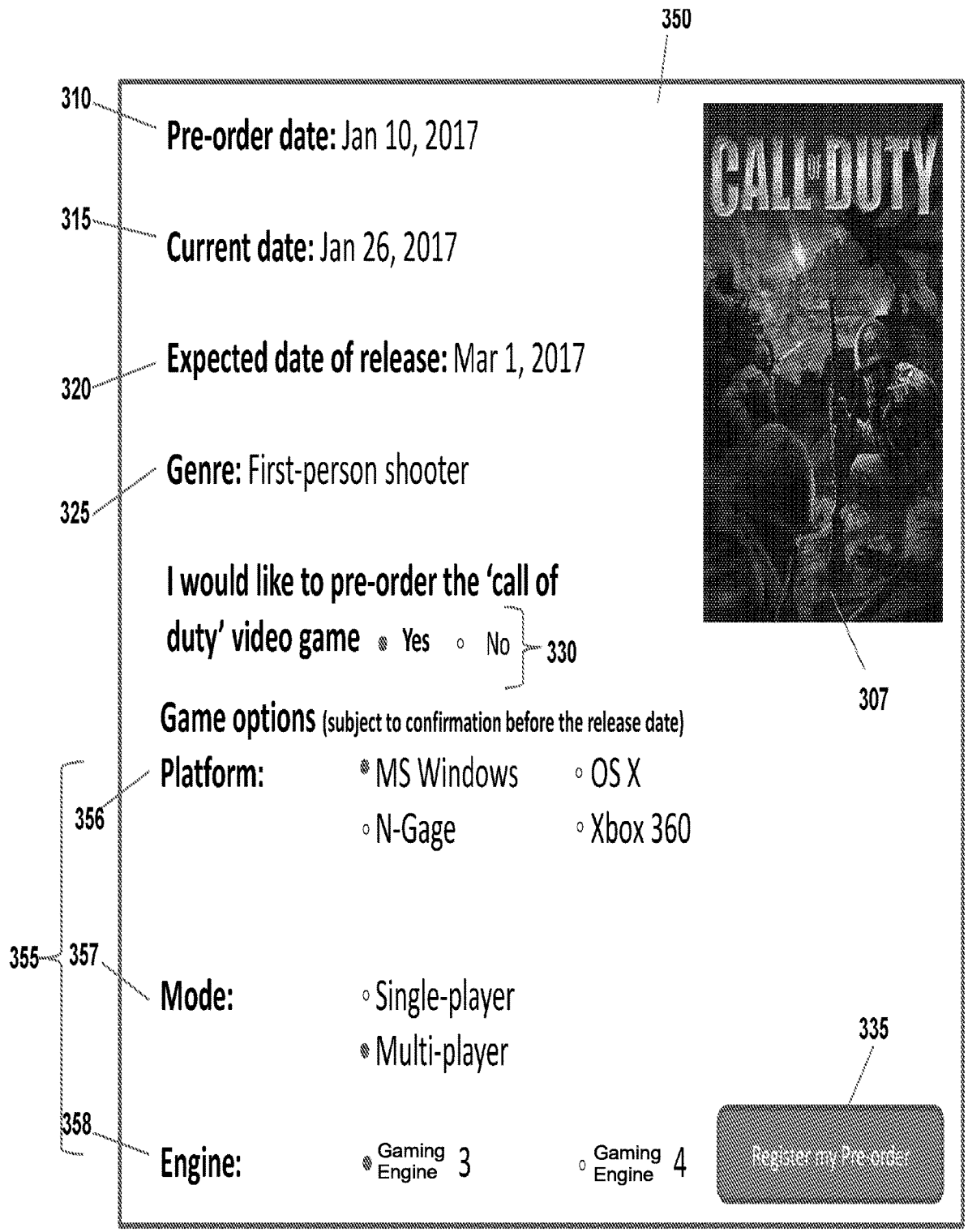

In less preferred embodiments, an interface to enable the buyer 130 to pre-order may also include a plurality of product attributes to choose from such as, but not limited to, functionalities, features, discounts, offers/incentives, warranty, terms related to future product updates, bundling, underlying platform and/or operating system versions. Accordingly, FIG. 3B shows another exemplary interface 350 displayed to enable the buyer 130 to pre-order the product 307 along with a set of example attributes 355 to choose from. The attributes 355 available to the buyer 130 at the time of pre-order include the platform 356 such as MS Windows, OS X, N-Gage and Xbox 360; the mode 357 such as single-player and multi-player; and the gaming engine 358 such as gaming engine 3 and gaming engine 4. As illustrated in the interface 350, the buyer 130 chooses the MS Window platform, the multi-player mode and the gaming engine 3 engine while pre-ordering. The buyer 130 then clicks the button 335 to confirm his choices. The interface 350 includes the pre-order start date 310, the current date 315 on which the buyer 130 access the app or website 105, the expected date of release 320 of the product, genre 325 and options 330 to choose or not-choose to pre-order the product.

It should be appreciated that the attributes 355 available at the time of pre-order may or may not change or evolve during the pre-order window. Similarly, the product 307 may have an associated SKU at the time of pre-order which also may or may not change depending upon whether the product attributes 355 evolve. Also, the interfaces 305 or 350 may be provided to the buyer 130 using any mode such as, but not limited to, email, social network, website or mobile app.

It should also be appreciated that the product attributes may differ depending upon the type and/or nature of the product being offered for pre-ordering. While the product 307 is a video game, in various embodiments the product may be any media or software product such as, but not limited to, music, electronic book, electronic file, movies, TV programs, and software programs or applications. For example, for movies or TV programs the attributes may comprise options such as the format (for example, DVD, Blu-ray, Blu-ray 3D, HD DVD) and/or the language (for example, English, Hindi, Japanese, Polish); for electronic books the attributes may comprise options such as the format (for example, PDF, Kindle Edition) and/or features such as text-to-speech (enabled or not); and for music the attributes may comprise options such as the format (for example, MP3, DVD Audio, Blu-ray, SACD) and/or the language (for example, English, Russian, Chinese, Japanese).

As a result, at step 225, the DE engine 115 generates a digital entitlement ticket that associates the Buyer ID with an SKU of the pre-ordered product and stores this information within a database management system corresponding to the digital retail system 120. If the buyer 130 is required to pay at the time of pre-ordering, the buyer 130 does so using the online payment processing system 135. Accordingly, the payment thus made is also associated with the digital entitlement ticket and stored in the database management system.

Optionally, at step 230, the buyer 130 may initiate a request to modify or change (including cancel) her pre-order. This may be due to the fact that the product may have evolved with a plurality of evolved product attributes or the buyer 130 may need to switch to another product or the buyer 130 may want to cancel her pre-order for other reasons. At step 235, the DE engine 115 determines if the date of the request for order modification lies within a product pre-order window. If the date of the request for order modification lies within the product pre-order window, the buyer 130 is allowed to modify her previous pre-order at step 240. Accordingly, the DE engine 115 cancels the previous entitlement ticket, and generates and stores (in the database management system) a new digital entitlement ticket that associates the Buyer ID with a new SKU of the current product being ordered. If the buyer 130 made payments while pre-ordering the earlier product, the payment is re-associated with the new digital entitlement ticket. It should be appreciated that in case of an order cancellation request, the buyer's payment is automatically credited to her account. It should also be appreciated that the buyer 130 is allowed to modify her pre-orders any number of times or, alternatively, for a predefined number of times during the product pre-order window.

If the date of the request for order modification lies beyond the product pre-order window, the buyer 130 is not allowed to modify her previous pre-order at step 245. Accordingly, the latest order and the corresponding latest digital entitlement ticket are locked-in. At step 250, at the end of the product pre-order window and/or on a product release date the latest digital entitlement ticket is communicated to at least one of a plurality of back-end entities 145 for processing and subsequent fulfilment or delivery.

At step 255, the buyer 130 is required to confirm her pre-order, and optionally select required product features, at a predefined period before the product release date. To enable this step, the buyer is presented with a second graphical user interface or plurality of interfaces that explain to the buyer that she pre-ordered the product and that it is time to confirm the pre-order and, if available, also choose and/or confirm the plurality of product attributes that may or may not have evolved from when the buyer pre-ordered the product.

FIGS. 3C and 3D show first and second exemplary interfaces 370, 390 displayed at a time proximate the product release date to enable the buyer 130 to confirm purchase of the product 307 along with select a set of attributes 375. The interfaces 370, 390 display the date 373 on which the buyer had pre-ordered, the current date 315, the confirmed date of release 374, genre 325 and options 380 to confirm (or reject) the pre-order. In less preferred embodiments, the attributes 375 are the same as the attributes 355 that were presented to the buyer 130 while pre-ordering.

However, in preferred embodiments, the attributes 375 are different or evolved compared to the originally available attributes or originally displayed attributes. In the present embodiment, for example, the attributes 375 being displayed include an option to choose an additional platform 376, namely, PlayStation 3. Also, a choice within the gaming engine 378 has evolved from gaming engine 4 in attributes 355 to gaming engine 6 in attributes 375, while the options within the mode 377 remain same as attributes 355. In accordance with an embodiment, the interface 370 displays the attributes 375 without any of the choices pre-filled or pre-selected. However, in an alternate embodiment, as shown in FIG. 3D, the alternate interface 390 displays the attributes 375 with the buyer's choices pre-filled or pre-selected. The buyer's choices are pre-filled or pre-selected based on her choices from the interface 350 of FIG. 3B. In various embodiments, the buyers choices are pre-filled or pre-selected based on the buyer's profile, historical purchase logs, or indicated interests from the interface 350. After choosing the attribute options, the buyer 130 can click on a button 385 to confirm the order.

Finally, at step 260, the DE engine 115 cancels any previous entitlement ticket, and generates and stores (in the database management system) a new digital entitlement ticket that associates the Buyer ID with a new SKU of the product being ordered with the evolved attributes 375. If the buyer 130 made payments while pre-ordering the product, the payment is re-associated with the new digital entitlement ticket. The latest digital entitlement ticket is communicated to at least one of a plurality of back-end entities 145 for processing and subsequent fulfilment or delivery.

The systems and methods implemented with reference to the e-commerce scenario 100 of FIG. 1 offer a plurality of advantages such as, but not limited to:

1. Neither requiring a level of product inventory to be stored with the Fulfilment Entities 145, prior to offering the product for sale, nor restricting buyer orders to the existing product inventory. The digital entitlement engine does not restrict the creation of tickets based on the amount of actual inventory of the product being pre-ordered. Conventional e-commerce scenarios require product inventory to be present with the Fulfilment Entities 145 prior to offering the product for sale since in conventional e-commerce scenarios buyers' purchase orders are communicated to the Fulfilment Entities 145, in real time or near real-time (such as during batch order processing), for processing and subsequent fulfilment or delivery. Accordingly, the buyer orders are also restricted to the amount of inventory. However, in the e-commerce scenario of the present specification, the product is offered for pre-ordering from the product pre-order date which is substantially in advance of the product release date, such as anywhere from one week to one year. Depending upon the number of pre-orders received (that is, product demand) during the product pre-order window, the required inventory or units of product can be better assessed and gradually modified in the period running up to the product release date (since the pre-orders are communicated to the entities 145 only at the end of the 'product pre-order window').

2. Providing the opportunity to the product manufacturer and/or retailer to evolve the product in terms of the plurality of product attributes and assess incremental evolved product demand and price discovery during the product pre-order window. Complementarily, the buyers are also allowed an opportunity to gravitate towards improved or evolved product with evolved product attributes at, for example, perceived VFM (Value-For-Money) pricing.

3. Freeing buyers from conventional cumbersome product cancellation, return, and exchange processes (also involving corresponding payment credits and debits) in scenarios where the buyers have not yet received delivery of the ordered product. It should be appreciated that the problems related to product cancellation, return and exchange processes are further exacerbated where a company representing a front-end digital retail system is not vertically integrated with back-end fulfilment entities. In the e-commerce scenario of the present specification, the product cancellation, return and exchange processes are seamless to the buyers during the entire product pre-order window.

4. Enabling a plurality of offers or incentives to be targeted and tailored to specific Buyer IDs and pushed to the buyers during the product pre-order window. The plurality of offers or incentives may be structured around the plurality of product attributes such as, but not limited to, functionalities, features, discounts, warranty, terms related to future product updates, bundling, underlying platform and/or operating system versions. In some embodiments, a buyer's pre-order profile information may be used to tailor the offers or incentives and encourage the buyer to purchase an evolved product offering. For example, a buyer's pre-order profile may include her preference for a certain operating platform for a video game (product) she pre-orders during the product pre-order window. In fact, in some embodiments, a specific operating platform for the video game may not be locked on the app or website 105 during the product pre-order window. Instead, a plurality of operating platform options may be disclosed and the buyer may be required to select at least one of such options that she prefers (the buyer can modify her operating platform option during the product pre-order window). Depending upon which one or more of the platform options garner the highest number of buyer preferences, the digital retail system 102 may decide to only release the top one or more preferred options, attune the number of products released based on the overall platform option profile of a universe of pre-orders and/or offer incentives related to certain preferred platform option(s) only so that most buyers gravitate towards the preferred option(s) during the product pre-order window.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A non-transient computer program product adapted to be executed in at least one server having at least one processor and stored in a non-transient memory, the non-transient computer program product comprising:

programmatic instructions that, when executed by the at least one server, generate data representative of a first graphical user interface, wherein said first graphical user interface comprises an option to purchase a video game without further comprising an option to specify one gaming platform of more than one gaming platforms for the video game;

programmatic instructions that, when executed by the at least one server, transmit the data to a first plurality of client devices such that each of said first plurality client devices receives said data and generates the first graphical user interface;

programmatic instructions that, when executed by the at least one server, receive data representative of at least one user's selection to purchase the video game;

programmatic instructions that, when executed by the at least one server, store data representative of the at least one user's selection to purchase the video game in a non-transient memory;

programmatic instructions that, when executed by the at least one server, generate data representative of a second graphical user interface based on the data representative of the at least one user's selection to purchase the video game, wherein the second graphical user interface comprises a request to select one gaming platform of the more than one gaming platforms for the video game;

programmatic instructions that, when executed by the at least one server, transmit the data representative of the second graphical user interface to a second plurality of client devices within a predefined period of time before a release date for the video game such that each of said second plurality of client devices receives data representative of the second graphical user interfaces and generates the second graphical user interface;

programmatic instructions that, when executed by the at least one server, receives data representative of at least one user's selection of the one gaming platform of the more than one gaming platforms for the video game; and programmatic instructions that, when executed by the at least one server, cause the video game selected via the first graphical user interface and based on the at least one user's selection of the one gaming platform of the more than one gaming platforms for the video game to be delivered to the at least one user, wherein the at least one server is configured to concurrently host at least 50 of the first plurality of client devices, concurrently host at least 50 of the second plurality of client devices, and host at least 10 transactions per second and wherein the at least one server is separate and distinct from a product fulfilment server system.

2. The non-transient computer program product of claim 1, further comprising programmatic instructions that, when executed by the at least one server, store data representative of the at least one user's selection of the one gaming platform of the more than one gaming platforms for the video game.

3. The non-transient computer program product of claim 1, wherein the first graphical user interface consists of one or more images of the video game, an option to purchase the video game, and a request to provide financial payment data.

4. The non-transient computer program product of claim 1, wherein the second graphical user interface further comprises an option to select a player mode.

5. The non-transient computer program product of claim 1, wherein the second graphical user interface further comprises a request to confirm the at least one user's prior selection to purchase the video game.

6. The non-transient computer program product of claim 1, wherein the predefined period of time before the release date for the video game is in a range of 1 day to twelve months.

7. The non-transient computer program product of claim 1, wherein the predefined period of time before the release date for the video game is at least one day.

8. The non-transient computer program product of claim 1, wherein the first graphical user interface does not comprise an option to select an operating system.

9. The non-transient computer program product of claim 1, wherein the second graphical user interface comprises an option to select an operating system.

10. A non-transient computer program product adapted to be executed in at least one server having at least one processor and stored in a non-transient memory, the non-transient computer program product comprising:

programmatic instructions that, when executed by the at least one server, generate data representative of a first graphical user interface, wherein said first graphical user interface comprises an option to purchase a video game without further comprising an option to select one or more additional media products to bundle into said purchase of the video game;

programmatic instructions that, when executed by the at least one server, transmit the data to a first plurality of client devices such that each of said first plurality client devices receives said data and generates the first graphical user interface;

programmatic instructions that, when executed by the at least one server, receive data representative of at least one user's selection to purchase the video game;

programmatic instructions that, when executed by the at least one server, store data representative of the at least one user's selection to purchase the video game in a non-transient memory;

programmatic instructions that, when executed by the at least one server, generate data representative of a second graphical user interface based on the data representative of the at least one user's selection to purchase the video game, wherein the second graphical user interface comprises a request to select one or more additional media products to bundle into said purchase of the video game;

programmatic instructions that, when executed by the at least one server, transmit the data representative of the second graphical user interface to a second plurality of client devices within a predefined period of time before a release date for the video game such that each of said second plurality of client devices receives data representative of the second graphical user interfaces and generates the second graphical user interface;

programmatic instructions that, when executed by the at least one server, receives data representative of at least one user's selection of one or more additional media products to bundle into said purchase of the video game; and programmatic instructions that, when executed by the at least one server, cause the video game selected via the first graphical user interface and the one or more additional media products selected via the second graphical user interface to be delivered to the at least one user, wherein the at least one server is configured to concurrently host at least 50 of the first plurality of client devices, concurrently host at least 50 of the second plurality of client devices, and host at least 10 transactions per second and wherein the at least one server is separate and distinct from a product fulfilment server system.

11. The non-transient computer program product of claim 10, further comprising programmatic instructions that, when executed by the at least one server, store data representative of the at least one user's selection of the one gaming platform of the more than one gaming platforms for the video game.

12. The non-transient computer program product of claim 10, wherein the first graphical user interface consists of one or more images of the video game, an option to purchase the video game, and a request to provide financial payment data.

13. The non-transient computer program product of claim 10, wherein the second graphical user interface further comprises an option to select a player mode.

14. The non-transient computer program product of claim 10, wherein the second graphical user interface further comprises a request to confirm the at least one user's prior selection to purchase the video game.

15. The non-transient computer program product of claim 10, wherein the predefined period of time before the release date for the video game is in a range of 1 day to twelve months.

16. The non-transient computer program product of claim 10, wherein the predefined period of time before the release date for the video game is at least one day.

17. The non-transient computer program product of claim 10, wherein the first graphical user interface does not comprise an option to select an operating system.

18. The non-transient computer program product of claim 10, wherein the second graphical user interface comprises an option to select an operating system.

\* \* \* \* \*